United States Patent

Muehlenbruch

[11] Patent Number: 4,645,336
[45] Date of Patent: Feb. 24, 1987

[54] METHOD AND APPARATUS FOR DETERMINING THE TRIMMED IMAGES OF ORIGINALS FOR REPRODUCTION ON PRINTING TECHNOLOGY

[75] Inventor: Dieter Muehlenbruch, Stoltenberg, Fed. Rep. of Germany

[73] Assignee: Dr. Ing. Rudolf Hell GmbH, Fed. Rep. of Germany

[21] Appl. No.: 873,475

[22] Filed: Jun. 11, 1986

Related U.S. Application Data

[63] Continuation of Ser. No. 598,967, Apr. 11, 1984, abandoned.

[30] Foreign Application Priority Data

Apr. 19, 1983 [DE] Fed. Rep. of Germany ....... 3314116

[51] Int. Cl.$^4$ ............................................. G03B 27/52
[52] U.S. Cl. ....................................... 355/61; 355/74; 355/75; 355/76; 355/125
[58] Field of Search ....................... 355/74, 75, 61, 76, 355/125

[56] References Cited

U.S. PATENT DOCUMENTS 1,576,511 3/1926 Huebner ............................. 355/125
1,712,854 5/1929 Thonet .................................. 355/76
4,270,173 5/1981 Suttler ............................... 355/61 X

OTHER PUBLICATIONS

"High Precision Viewer Setter Determines Magnifications for Color Originals to be Scanned", by Dai-Nippon Screen Mfg. Co. Ltd., two pages printed in Japan Feb. 1982.
Krause Technologie Ihre Basis Fur Die Zukunft in German one page.

*Primary Examiner*—L. T. Hix
*Assistant Examiner*—D. Rutledge
*Attorney, Agent, or Firm*—Hill, Van Santen, Steadman & Simpson

[57] ABSTRACT

Method and apparatus for determining the trimmed image of originals for reproduction with opto-electrical original scanning wherein a mask is produced before the actual original scanning and the mask includes clearance for receiving the original therein. The mask and original are adjusted with respect to the desired trimmed image and the angular position by placing it in a projection head of an apparatus for scale identification wherein the holder of the original can be removed from the projection head of the apparatus and hinged downwardly for performing these functions.

6 Claims, 3 Drawing Figures

METHOD AND APPARATUS FOR DETERMINING THE TRIMMED IMAGES OF ORIGINALS FOR REPRODUCTION ON PRINTING TECHNOLOGY

This is a continuation of application Ser. No. 598,967, filed Apr. 11, 1984, now abandoned.

BACKGROUND OF THE INVENTION

1. Field of the Invention

This invention relates in general to methods and apparatus for determining trimmed images of originals which are to be reproduced in the printing technology using optoelectrical original means.

2. Description of the Prior Art

In printing technology, there is a demand for most precise determination of the desired scale of reproduction for producing color separations by means of so-called scanners which produce color separations by means of photo-electrical optical scanning. For this purpose, enlargement devices are known and in the prior art, the enlargement or reduction is measured before actual scanning occurs and a color slide that is to be scanned is projected onto a projection table using the light source. At one side of the projection table there is provided a vertical support which carries the projection head which can be moved up and down with the motor. The desired scale can be set and read depending on the position of the projection head.

A vertical frame or beam member which carries the projection head can be moved up and down with a motor and the desired scale can be set and read depending on the position of the projection head.

It turns out in practice, however, that the operation of such devices is complicated and time consuming and the precision obtained depends a great deal on the skill of the particular operator.

SUMMARY OF THE INVENTION

It is therefore an object of the present invention to provide a method and improved apparatus for determining the trimmed image and the scale for reproduction by using simple operations and wherein a more precise determination of the trimmed image and of the scale is possible.

It is an object of this invention to provide a removeable, tiltable frame member which holds the original and into which the original is mounted in a mask which has an opening specifically formed for the original and wherein the operator can set moveable scales so as to establish the enlargement or reduction of the original.

Other objects, features, and advantages of the invention will be readily apparent from the following description of certain preferred embodiments thereof taken in conjunction with the accompanying drawings although variations and modifications may be effected without departing from the spirit and scope of the novel concepts of the invention and in which:

DESCRIPTION OF THE PREFERRED EMBODIMENTS

Figure 1:
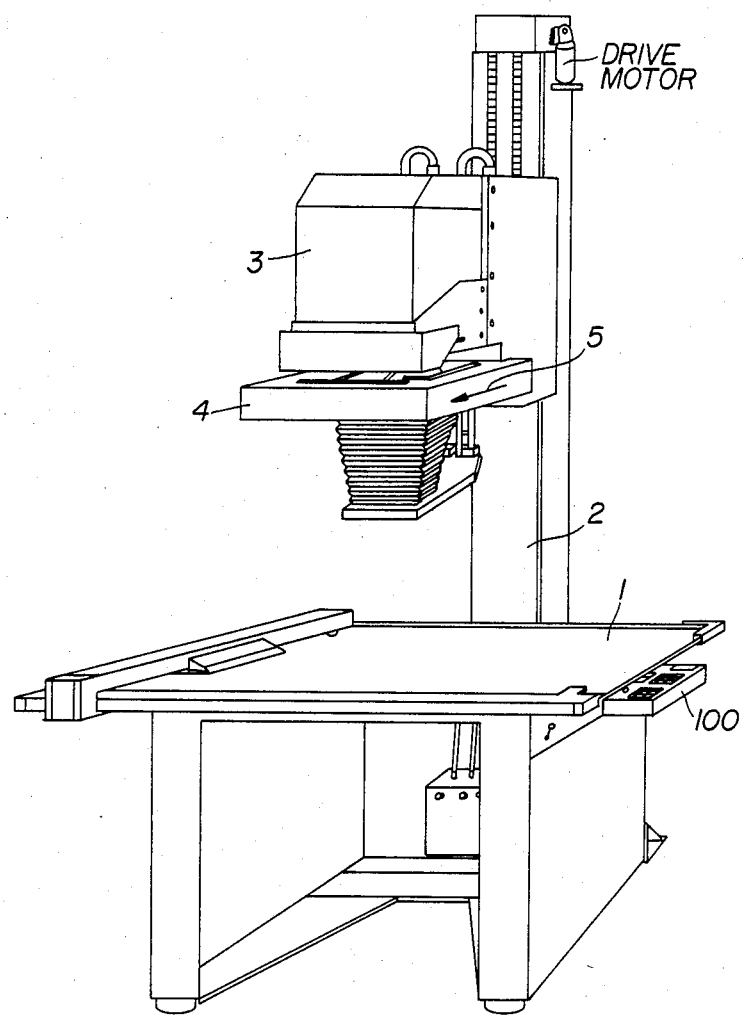
FIG. 1 is a perspective view of the apparatus of the invention.

FIG. 1 illustrates a projection table 1 which has an upwardly extending vertical frame or beam member 2 which is laterally offset from the work surface of the table 1. A projection head 3 is moveably mounted on the vertical frame or beam member 2 and can be moved up and down with a suitable driving motor. The projection head 3 contains an original holder 4 which for mounting and removeable purposes can be pulled out of the projection head in the direction of arrow 5 and functions similar to a drawer. Guie rails or the like can be utilized for guiding the original holder. An operating keyboard 100 is mounted at the side of the table 1 as illustrated and can be used for providing commands to the unit.

Figure 2:
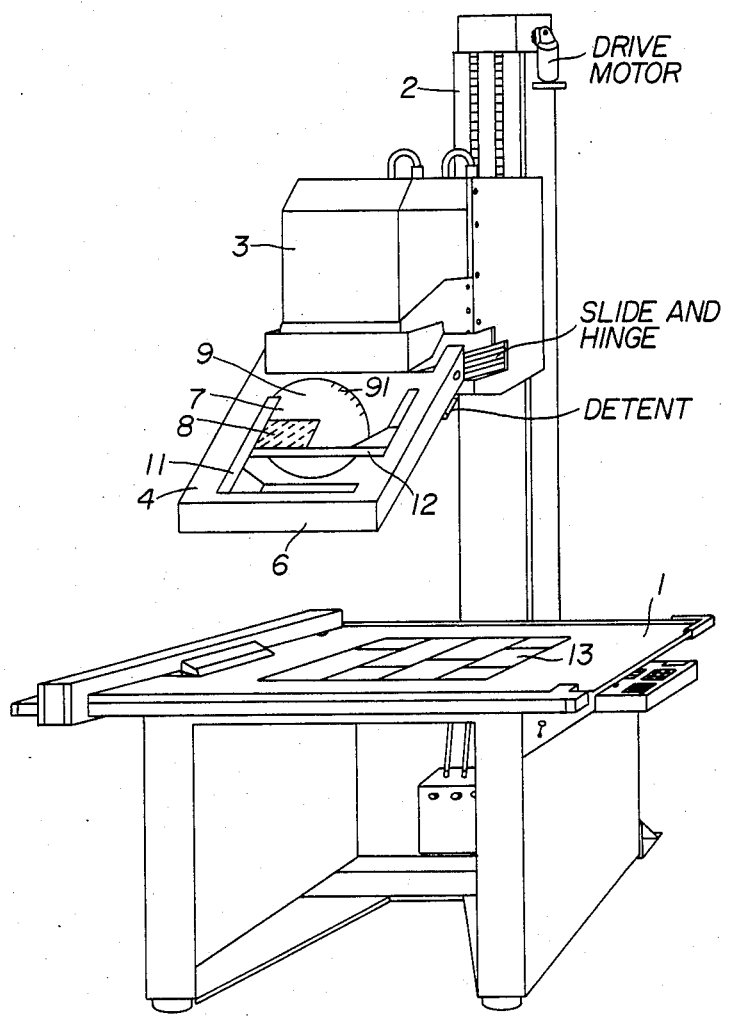
FIG. 2 is a perspective side view of the invention illustrating the projection head and extended original holder pivoted to its lower position.

FIG. 2 is a second view of the projection table illustrating the work holder for the original in the work position. The work holder 4 consists of a frame 6 in the inside of which the acceptance area 7 for the original is provided. The acceptance device 7 for the original comprises a round disc 9 which has a scale 91. Moveable trimming rules 11 and 12 are provided which allow the trimmed image to be selected by moving the rules. The rules 11 and 12 and the original holder 4 can be motor driven by manipulation of the operating keyboard 100.

Figure 3:
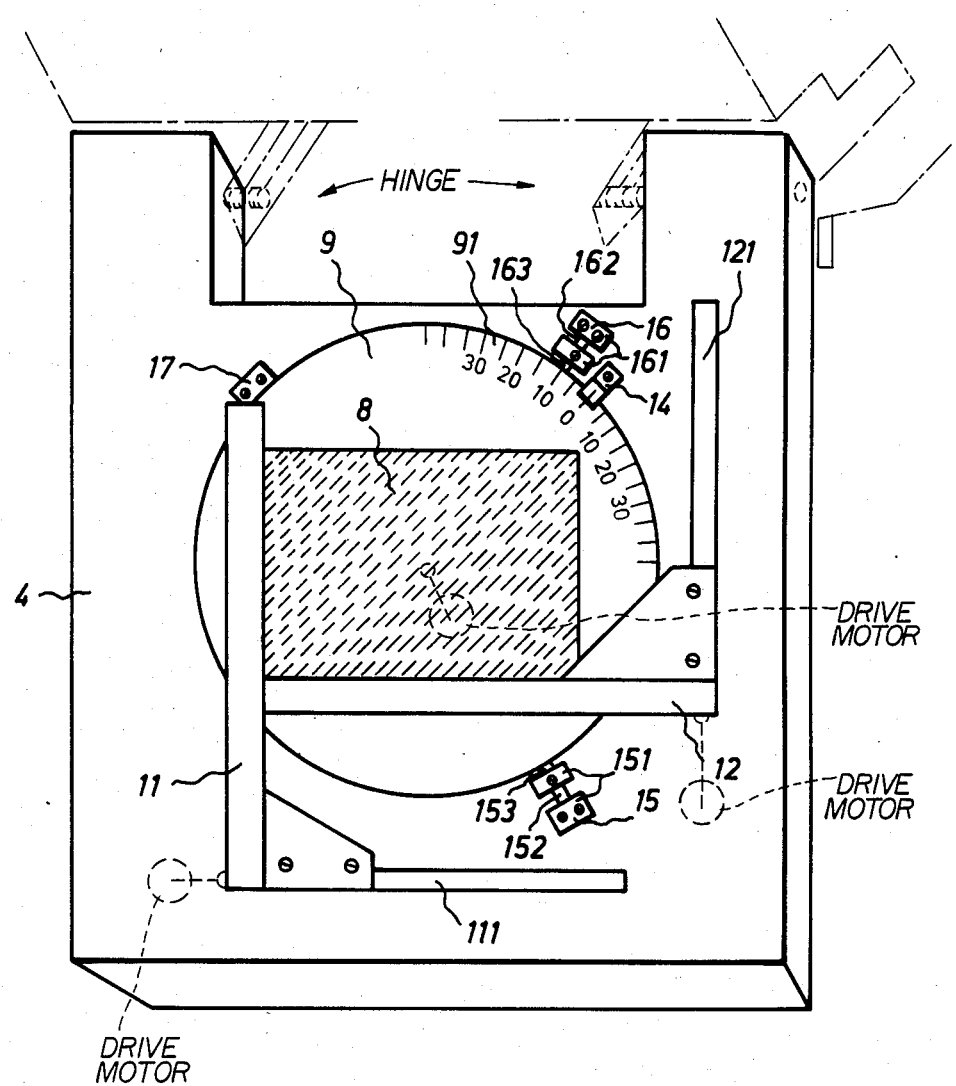
FIG. 3 is a plan view of the holder for the original.

FIG. 3 is a plan view of the original holder 4. The rules 11 and 12 may be hinged. The rules 11 and 12 are moveable mounted in rails 111 and 121. The original 8 together with its mount 9 are rotatable under the rules 11 and 12. The mount 9 consists of a round disk which comprises an angle scale 91 at its outer edge and the zero position can be read using the mark or indicia 14 which is fixed relative to the holder 4. The disk 9 is held within detents 15, 16 and 17 and the detents 15 and 16 respectively consist of stationary members 151 and 161 and resilient portions 151 and 152 which respectively comprise a roller 153 and 163 which press against the edge of the disc 9 as illustrated in FIG. 3. The disc 9 can be rotated to any desired angular position by operating the keyboard 100 which controls a motor drive provided in the original holder 4. The rules 11 and 12 can also be electrically moved by operating the control panel 100 and the original holder 4 contains suitable motors for providing this function.

In operation, an original, for example a color slide is glued into a mask and nested into the holder 7. The mask may be transparent or opaque and holds the original which may be a 35 millimeter slide, for example. A layout image 13 is mounted on the projection table 1 as illustrated in FIG. 2 and the original image is placed into the operating position of FIG. 1 and the original image is projected onto and brought into coincidence with the area assigned in the layout image 13 to the particular original using the enlarger. In other words, the distance of the projection head from the projection table is set using the control panel 100 and the scale required so as to match the original with the area assigned to it in the layout 13 can be directly read from the apparatus when it is set. A fast and exact determination of trim is possible by using the electrically controlled trimmer rules 11 and 12 and the angle guide comprising the disc 9 and the scale 91. The starting point and the angular position are identified and marked on the mask or on the slide. The starting point is marked on the mask and indicates the point at which the scanner will start to scan. The starting point is marked on the mask by the intersection of two lines which are at right angles to each other which show one side boundary and the angular orientation of the original. After the adjustment and setting has been accomplished, the complete slide mask is mounted with the marks on the reference line of the color scanning drum.

All of the functions of the apparatus are precisely motor controlled and the adjustment of the projection head 3, the movement of the trim rules 11 and 12 and the angular rotation of the disc 9 are accurately and positively controlled by a suitable motor means. After every work pass the projection head 3 returns to the comfortable work position for the operator shown in FIG. 2 wherein the slide holder 4 is pivoted down so that it is easily available for an operator.

The apparatus also has an electronic focus adjustment. An exposure timer can advantageously be provided for a fast layout design.

The advantages of the apparatus is time saving in determining the reproduction scale as well as the trimmed image and of exact squaring of the image. Also, as is clearly shown in FIG. 3 rule 11 defines a vertical reference and rule 12 defines a horizontal reference and, thus, the rules 11 and 12 allow exact squaring of the image since they are at right angles to each other as is also apparent from FIG. 3 manipulation of the device is very simple and can be performed by inexperienced operators.

The present invention allows reproduction scale to be correctly established for the original and also allows the horizontal reference line and the vertical reference line to be marked on the mask. These lines intersect at the "starting point" and are used to mount the mask and original on the scanning drum of the scanner which has a horizontal reference on its periphery.

Although the invention has been described with respect to preferred embodiments, it is not to be so limited as changes and modifications can be made which are within the full intended scope of the invention as defined by the appended claims.

I claim as my invention:

1. A method for producing reference markings on a mask in which an original is mounted so that it can be correctly positioned in an opto-electrical scanner comprising the steps of: mounting an original which is to be reproduced on a transparent or opaque substrate which forms the mask, placing said substrate and original on a holder of a projection table machine, angularly rotating said original and substrate to a desired position, marking a horizontal and a vertical line on said substrate which indicate the edges of material to be reproduced from said original, projecting a light beam through said original on to the table of said projection table machine and adjusting the vertical position of said original and substrate so that the desired size of an image which is to be reproduced from said original is obtained, and removing said original and substrate from said holder so that it can be placed in said opto-electrical scanner.

2. A method according to claim 1 wherein the intersections of said marked horizontal and vertical lines indicate a starting point.

3. Apparatus for determining trimmed images of originals which are to be reproduced by opto-electric scanning means comprising a projection table, a vertically mounted beam mounted on a side of the projection table, and a projection head moveably mounted for up and down movement on the beam, an original holder contained on said projection head, said original holder consists of a frame which comprises a mount for the original which is transparent, said frame moveably mounted so it can be withdrawn from the projection head in the manner of a drawer, said frame pivotably hinged to said frame on its side which faces the projection head, and said frame when in its withdrawn position is hingeable obliquely down and rests against a detent at its hinged point with the projection head.

4. Apparatus according to claim 3 wherein the mount for the original is rotated by a motor mounted within the frame.

5. Apparatus according to claim 4 wherein the mount for the original consists of a round disk with graduations.

6. Apparatus according to claim 3 wherein electrically controlled trimmer rules are mounted within said frame which can be positioned on the mask to indicate the horizontal and vertical reference lines for said original which is to be reproduced by said scanning means.

* * * * *